(12) United States Patent
Potlapally et al.

(10) Patent No.: US 10,303,879 B1
(45) Date of Patent: May 28, 2019

(54) MULTI-TENANT TRUSTED PLATFORM MODULES

(71) Applicant: Amazon Technologies, Inc., Reno, NV (US)

(72) Inventors: Nachiketh Rao Potlapally, Arlington, VA (US); Uwe Dannowski, Moritzburg (DE); Derek Del Miller, Austin, TX (US); David James Borland, Austin, TX (US); Rahul Gautam Patel, Austin, TX (US); William John Earl, Burien, WA (US)

(73) Assignee: Amazon Technologies, Inc., Reno, NV (US)

( * ) Notice: Subject to any disclaimer, the term of this patent is extended or adjusted under 35 U.S.C. 154(b) by 696 days.

(21) Appl. No.: 14/535,056

(22) Filed: Nov. 6, 2014

(51) Int. Cl.
*G06F 9/44* (2018.01)
*G06F 9/445* (2018.01)
*G06F 21/57* (2013.01)
*G06F 9/455* (2018.01)
*G06F 8/65* (2018.01)

(52) U.S. Cl.
CPC .......... *G06F 21/57* (2013.01); *G06F 9/45545* (2013.01); *G06F 9/45558* (2013.01); *G06F 8/65* (2013.01); *G06F 2009/45587* (2013.01)

(58) Field of Classification Search
CPC .................. G06F 8/65; G06F 8/67; G06F 8/68
See application file for complete search history.

(56) References Cited

U.S. PATENT DOCUMENTS 7,552,419 B2 * 6/2009 Zimmer .................. G06F 21/53 717/121
7,802,092 B1 9/2010 Kelly et al.
(Continued)

FOREIGN PATENT DOCUMENTS

KR 1020130044293 5/2013
KR 1020140117449 10/2014
(Continued)

OTHER PUBLICATIONS

Onoue et al., "Host-based Multi-tenant Technology for Scalable Data Center Networks", ACM, ANCS'12, Oct. 2012, pp. 87-98; <https://dl.acm.org/citation.cfm?id=2396577> (Year: 2012)*
(Continued)

*Primary Examiner* — S. Sough
*Assistant Examiner* — Ben C Wang
(74) *Attorney, Agent, or Firm* — Robert C. Kowert; Meyertons, Hood, Kivlin, Kowert & Goetzel, P.C.

(57) ABSTRACT

A multi-tenant trusted platform module (MTTPM) is attached to a communication bus of a virtualization host. The MTTPM includes a plurality of per-guest-virtual-machine (per-GVM) memory location sets. In response to an indication of a first trusted computing request (TCR) associated with a first GVM of a plurality of GVMs instantiated at the virtualization host, a first memory location of a first per-GVM memory location set is accessed to generate a first response indicative of a configuration of the first GVM. In response to an indication of a second TCR associated with a second GVM, a second memory location of a second-per-GVM memory location set is accessed to generate a second response, wherein the second response is indicative of a different configuration of the second GVM.

23 Claims, 9 Drawing Sheets

(56) References Cited

U.S. PATENT DOCUMENTS

| | | | |
|---|---|---|---|
| 8,074,262 B2* | 12/2011 | Scarlata | G06F 21/53 726/4 |
| 8,375,221 B1 | 2/2013 | Thom et al. | |
| 8,458,494 B1 | 4/2013 | Galvao et al. | |
| 8,522,018 B2 | 8/2013 | Molina et al. | |
| 8,621,078 B1 | 12/2013 | Mukerji et al. | |
| 8,949,818 B2* | 2/2015 | Chhabra | G06F 8/65 717/168 |
| 8,984,610 B2* | 3/2015 | Spiers | H04L 63/0218 726/9 |
| 9,071,429 B1* | 6/2015 | Roth | H04L 9/0894 |
| 9,100,827 B2 | 8/2015 | Adi | |
| 9,135,040 B2* | 9/2015 | Karve | G06F 9/45545 |
| 9,246,690 B1* | 1/2016 | Roth | H04L 9/3268 |
| 9,367,339 B2* | 6/2016 | Potlapally | G06F 21/57 |
| 9,413,765 B2* | 8/2016 | Swanson | H04L 63/10 |
| 9,525,672 B2* | 12/2016 | Cignetti | H04L 63/0428 |
| 9,552,485 B1* | 1/2017 | Cignetti | G06F 21/602 |
| 9,578,017 B2* | 2/2017 | Ferguson | H04L 63/0823 |
| 9,667,493 B2* | 5/2017 | Chhabra | G06F 8/65 |
| 2005/0210467 A1* | 9/2005 | Zimmer | G06F 21/53 718/1 |
| 2006/0256107 A1 | 11/2006 | Scarlata et al. | |
| 2007/0094719 A1* | 4/2007 | Scarlata | G06F 21/53 726/9 |
| 2011/0302415 A1 | 12/2011 | Ahmad et al. | |
| 2012/0246475 A1 | 9/2012 | Yoo et al. | |
| 2012/0265976 A1* | 10/2012 | Spiers | H04L 63/0218 713/2 |
| 2013/0086383 A1 | 6/2013 | Bogorad et al. | |
| 2013/0151848 A1 | 6/2013 | Baumann et al. | |
| 2014/0006776 A1 | 1/2014 | Scott-Nash et al. | |
| 2014/0007087 A1* | 1/2014 | Scott-Nash | G06F 21/53 718/1 |
| 2014/0026124 A1* | 1/2014 | Gilbert | G06F 21/575 717/124 |
| 2014/0047229 A1* | 2/2014 | Wiseman | G06F 13/14 713/2 |
| 2014/0208111 A1* | 7/2014 | Brandwine | H04L 63/0428 713/171 |
| 2014/0208123 A1* | 7/2014 | Roth | G06F 21/72 713/189 |
| 2014/0259125 A1* | 9/2014 | Smith | G06F 21/32 726/5 |
| 2014/0282889 A1 | 9/2014 | Ishaya et al. | |
| 2014/0310510 A1* | 10/2014 | Potlapally | G06F 9/4401 713/2 |
| 2015/0007175 A1* | 1/2015 | Potlapally | G06F 21/57 718/1 |
| 2015/0149751 A1* | 5/2015 | Nemiroff | G06F 21/575 713/2 |
| 2015/0244716 A1* | 8/2015 | Potlapally | H04L 63/064 713/155 |
| 2015/0256332 A1* | 9/2015 | Raj | H04L 9/085 713/150 |
| 2015/0281189 A1* | 10/2015 | Nayshtut | H04L 63/045 713/168 |
| 2015/0281237 A1* | 10/2015 | Swanson | H04L 63/10 726/3 |
| 2015/0319160 A1* | 11/2015 | Ferguson | H04L 9/0894 726/10 |
| 2016/0094573 A1* | 3/2016 | Sood | H04L 63/1433 713/156 |
| 2016/0156621 A1* | 6/2016 | Thom | H04L 63/0853 713/175 |
| 2016/0203313 A1* | 7/2016 | El-Moussa | G06F 8/65 726/23 |
| 2016/0366141 A1* | 12/2016 | Smith | H04L 63/062 |
| 2017/0019387 A1* | 1/2017 | Ylonen | H04L 63/062 |
| 2017/0255472 A1* | 9/2017 | Potlapally | G06F 9/4401 |

FOREIGN PATENT DOCUMENTS

| | | |
|---|---|---|
| RU | 2518924 | 5/2013 |
| WO | 2012009231 | 1/2012 |
| WO | 2012047088 | 4/2012 |
| WO | 2013101178 | 7/2013 |
| WO | 20130112389 | 8/2013 |

OTHER PUBLICATIONS

Alan Magar, "Data protection in multi-tenant cloud Environments", Defence R&D Canada, Dec. 2012, pp. 1-34; <http://cradpdf.drdc-rddc.gc.ca/PDFS/unc121/p537069_A1b.pdf> (Year: 2012).*

Membrey et al., "Trusted Virtual Infrastructure Bootstrapping for On Demand Services", IEEE, Aug. 2012, pp. 350-357; <https://ieeexplore.ieee.org/stamp/stamp.jsp?tp=&arnumber=6329204> (Year: 2012).*

U.S. Appl. No. 14/188,630, filed Feb. 24, 2014, Nachiketh Rao Potlapally.

U.S. Appl. No. 13/932,828, filed Jul. 1, 2013, Nachiketh Rao Potlapally.

Amazon Web Services, "AWS CloudHSM Getting Started Guide", Nov. 5, 2013, pp. 1-45.

TCG, "TPM Main, Part 1 Design Principles", Mar. 1, 2011, pp. 1-172.

TCG, "TPM Main, Part 2 TPM Structures", Mar. 1, 2011, pp. 1-190.

TCG, "TPM Main, Part 3 Commands", Mar. 1, 2011, pp. 1-328.

"Trousers FAQ", accessed Oct. 3, 2014, pp. 1-9.

U.S. Appl. No. 14/577,232, filed Dec. 19, 2014, Todd Lawrence Cignetti.

Extended European Search Report from PCT/US2015017354, dated Sep. 26, 2017, pp. 1-8.

Anonymous, "How to turn an old netbook into a NAS drive", dated Mar. 1, 2010, pp. 1-5.

Hermann Apfelbock, "Alte Gerate in NAS-Server Verwandeln-PC-WELT", dated Jun. 13, 2014, pp. 1-7.

Office Action from European Application No. 16739357.8-1222, dated Jun. 11, 2018 (Amazon Technologies, Inc.) pp. 1-8.

* cited by examiner

MULTI-TENANT TRUSTED PLATFORM MODULES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Traditionally, applications that require high levels of security have typically been implemented at customer-owned data centers, where the organizations on whose behalf the applications are executed have complete control of the physical and computing environments. For cost and convenience reasons, some clients may wish to utilize virtualized computing services implemented at provider data centers for critical applications that require high security. However, a client may be reluctant to do so without some level of assurance that the execution environments being used meet the client's security requirements and have not been tampered with. Such concerns may be especially significant in multi-tenant environments in which a given hardware server may potentially be shared by several virtual machines instantiated on behalf of respective clients.

Figure 1:
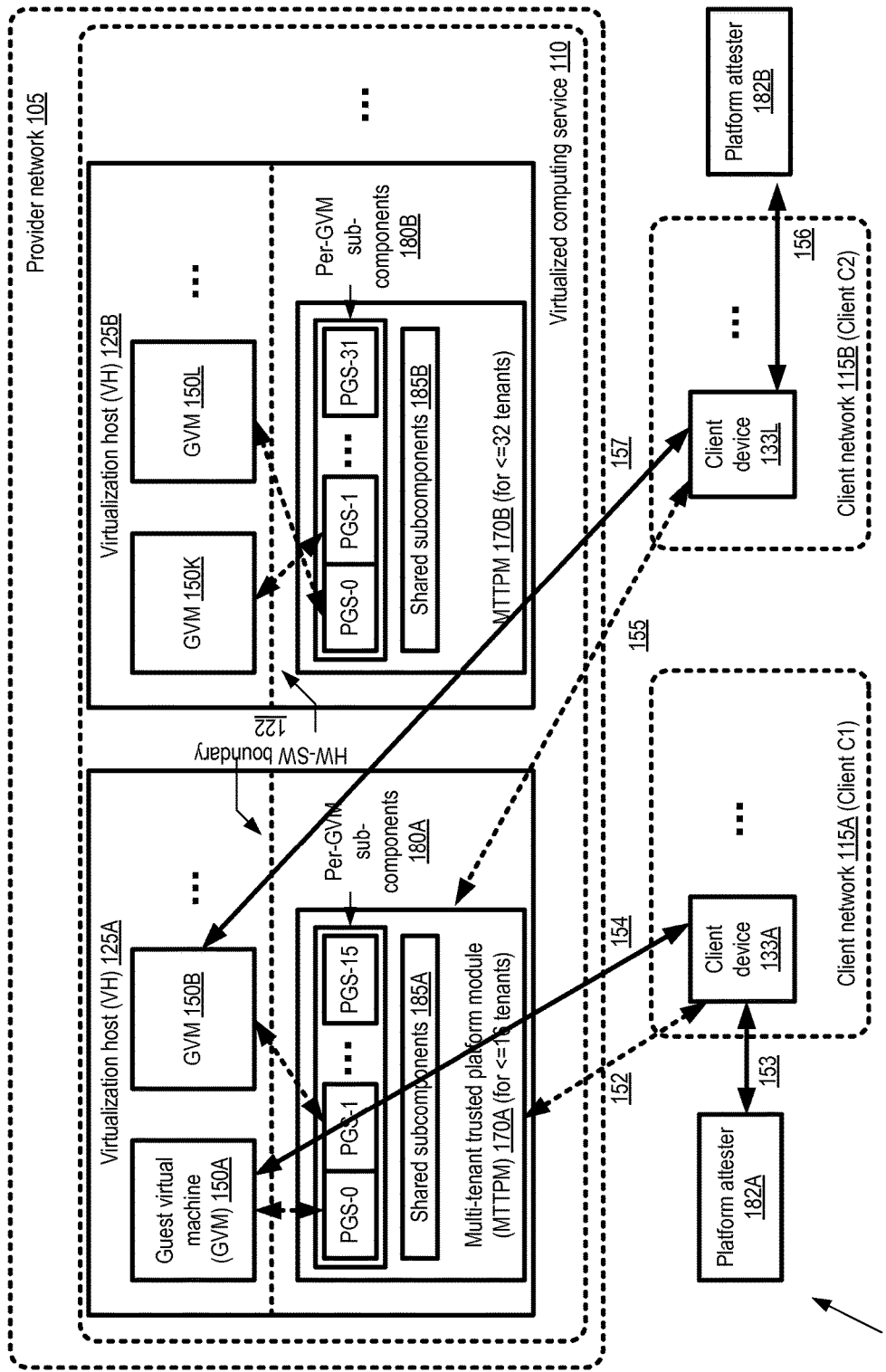
FIG. 1 illustrates an example system environment in which virtualization hosts of a provider network may be equipped with multi-tenant trusted platform modules (MTTPMs), according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for performing trusted computing operations using multi-tenant trusted platform modules (MTTPMs) at provider networks are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines (GVMs) on behalf of respective clients at a given hardware server, without any of the clients being informed that the hardware server is being shared with other clients. GVMs may also be referred to as "compute instances" or simply as "instances" herein, and the hardware servers on which one or more GVMs are instantiated may be referred to as "virtualization hosts" or "instance hosts". A provider network may support single-tenant services (such as for private cloud implementations) in some embodiments, either in addition to, or instead of, multi-tenant services, and a resource such as a virtualization host may be used in single-tenant mode or multi-tenant mode during a given time period. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In accordance with accepted virtualization approaches, details about the virtualization hosts (such as the absolute performance capabilities of processors or cores being used, or the specific data centers at which the virtualization hosts are physically located) as well as the mappings between compute instances and virtualization hosts (e.g., how many compute instances are run at a given virtualization host, or the identity of the clients whose instances share a host), may at least in some cases be unavailable to the clients on whose behalf compute instances are run. At each instance host, the computing service may typically deploy a virtualization management software stack with one or more virtualization management components, such as a hypervisor, an administrative operating system domain, and the like, which may also be inaccessible to the clients for obvious security reasons. In some embodiments, different types or categories of compute instances (e.g., "small", "medium" or "large" instances corresponding to one or more operating systems) may be defined by the computing service, with some indication of the relative capabilities of each instance type and the corresponding pricing policies being made available to potential clients. Given the instance type definitions, in one embodiment clients may be able to select how many instance of each type they wish to acquire within some hierarchical sub-unit of the provider network such as a loosely geographically-defined "region".

Some clients of the provider network may demand higher levels of security for at least some of their applications than others. (It is noted that the term application, as used herein, may refer to any type of executable program component or combination of components, which may run in user mode, kernel/system mode, or a combination of user and kernel/system modes.) In particular, in view of the fact that direct client access to the hardware and the virtualization management software stack at a virtualization host may be prohibited or at least highly constrained, clients may wish to obtain some level of assurance that a proposed execution environment to be used for a client application has not been tampered with or penetrated by malicious entities. In at least some embodiments, the virtual computing service may provide a mechanism for cryptographic attestation or certification (e.g., by trusted third parties) of at least a portion of the execution environment configured for the GVMs. The attestation may, for example, involve comparing some set of signatures or unique values representing the execution platform that is to be used for a given GVM on behalf of a client, with some set of pre-approved unique values corresponding to acceptable execution environments. For example, in one embodiment the service may utilize a hardware trusted platform module (TPM) to compute one or more values intended to represent a unique encoding of a set of resources (e.g., various elements of firmware, software and/or hardware) used to implement a GVM. The set of resources may be referred to herein as a "resource stack" or "resource configuration" of the execution environment.

According to at least some embodiments, at least some of the virtualization hosts of a provider network may be equipped with multi-tenant TPMs (MTTPMs). An MTTPM designed for use a virtualization host that is to support up to N GVMs may comprise one set of shared subcomponents (such as generators of various types of cryptographic values described below) that are to be used to respond to requests pertaining to multiple GVMs of the host at which the MTTPM is attached, and N sets of per-GVM subcomponents (such as memory locations at which GVM-specific state information may be stored). By designating respective hardware subcomponents for each of N GVMs, a higher level of security may be achievable using a MTTPM than would be possible if, for example, a single set of hardware components were shared for all the GVMs of the virtualization host. In some embodiments, a family of MTTPM types may be implemented, e.g., a high-tenancy MTTPM that can support up to 128 GVMs, a medium-tenancy MTTPM that can support up to 64 GVMs, and a low-tenancy MTTPM that can support up to 32 GVMs. As the number of per-GVM subcomponents required may increase with the maximum number of GVMs to be supported, it may cost more to build and/or use a high-tenancy MTTPM in the scenario described above than it costs to build and/or use a medium-tenancy MTTPM or a low-tenancy MTTPM.

In some embodiments, both MTTPMs and single-tenant TPMs (STTPMs) may be supported. As their name implies, in contrast to MTTPMs, single-tenant TPMs may not include any subcomponents that are GVM-specific; instead, STTPMs may comprise subcomponents that are intended primarily for a "bare-metal" host as a whole (even if the host is eventually used for many GVMs), or for virtualization hosts that comprise no more than one GVM. In one embodiment, it may be possible to attach either an STTPM or an MTTPM to the same virtualization host, e.g., without any additional hardware changes. That is, the hardware I/O interface of the MTTPM (e.g., a connector to a Low Pin Count or LPC bus, or some other interconnect) in such an embodiment may be designed to be compatible with the corresponding I/O interface of an STTPM. The requests or commands that are to be implemented using a TPM (either an STTPM or an MTTPM) may be referred to as "trusted computing requests" (TCRs) herein. A number of different types of TCRs may be supported in various embodiments, including for example requests to validate configurations of the virtualization hosts and/or the GVMs, requests to generate and/or store cryptographic artifacts such as hash values or keys, requests to associate or "seal" encrypted values with a corresponding configuration state such that the values cannot be decrypted if the configuration state has changed, and so on. TCRs may originate at a number of different layers of the software stack in different embodiments. For example, some TCRs may originate at the application layer of a GVM (or at an external entity communicating with a virtualization host comprising a TPM), and may be translated into specific command sequences transmitted to TPMs from lower levels of software such as virtualization management components as discussed below. Other TCRs may originate at operating system layers, device driver layers, and so on.

In at least some embodiments, in addition to the hardware interface compatibility between STTPMs and MTTPMs, software compatibility may also be enforced. Some trusted computing applications (TCAs), such as applications that verify the resource configuration of a platform, or applications that utilize cryptographic keys that are generated or stored at TPMs, may have been designed and implemented in accordance with an STTPM standard or specification. Such standards/specifications may not necessarily include guidelines for the use of per-GVM subcomponents. However, depending on the category of the TCR that is generated on behalf of a given TCA, the per-GVM subcomponent pertaining to the specific GVM with which the TCR is associated may have to be utilized at the MTTPM. Accordingly, in order to support applications that may not have been designed to natively utilize per-GVM subcomponents of the MTTPM, in some embodiments a translation or transformation mechanism may be used to convert the STTPM-compatible requests/commands into corresponding MTTPM requests/commands.

In one embodiment in which a memory-mapped I/O (MMIO) address range is defined as the set of target addresses to be used for TCRs directed to STTPMs, a virtualization management component (VMC) such as a hypervisor may generate and store a mapping, for each GVM, between the baseline MMIO address range (the address range defined for STTPM-compatible applications) and a GVM-specific MMIO address range. Thus, for example, if a particular request associated with GVM-0 were to be targeted to MMIO address Addr1 in the baseline address range, the target address may be mapped to MMIO address Addr2 by the VMC before the request is transmitted to the MTTPM. If a request with the same target address Addr1 were received, but the second request were associated with a different GVM such as GVM-k, Addr1 may be mapped to a different target address Addr-k before the request is transmitted to the MTTPM. In some implementations, the mapping may be stored in the extended page tables of a memory management unit. In embodiments in which the MMIO address mappings are pre-generated and stored, TCRs with baseline or STTPM-compliant MMIO target addresses may be translated with very little overhead into TCRs with MTTPM-compatible addresses. In one embodiment, instead of storing a mapping between STTPM-compliant MMIO target addresses and MTTPM-compliant MMIO target addresses and quickly looking up the mapping entry for a given TCR, the address translation may be performed dynamically, e.g., without consulting a pre-existing mapping.

In some embodiments, it may be possible to characterize a given TCR as belonging to into either a "shared" or a "GVM-specific" category, depending on whether the shared subcomponents of the MTTPM are used to respond to the TCR, or whether the per-GVM subcomponents are used. In one embodiment, this characterization may be performed at the MTTPM itself—e.g., upon receiving an indication of a TCR, the MTTPM firmware may determine which type of subcomponent is to be used. In other embodiments, a higher-level component of the trusted computing stack, such as a VMC, may determine the type of TCR to be submitted, and different sets of commands or requests may be supported for shared-category TCRs than are supported for GVM-specific TCRs.

As mentioned earlier, the per-GVM subcomponents of an MTTPM may include a respective set of memory locations (e.g., in an electronically-erasable programmable random access memory (EEPROM) or in some set of registers) for each of several GVMs that may be instantiated at a given virtualization host in some embodiments. Such memory locations may be used, for example, to store hash values indicating the configuration of the corresponding GVM's operating system and/or application software, and may therefore be usable to distinguish between GVM configurations. Consider a simple scenario in which there are two GVMs, GVM-0 and GVM-1, running on a virtualization host. A hash value corresponding to GVM-0's configuration may be generated at the MTTPM and stored in a first per-GVM memory location such as a platform configuration register PCR-0, and a hash value corresponding to GVM-1's configuration may be stored in PCR-1, a second per-GVM PCR. In response to an indication of a first TCR, belonging to a "GVM-specific" category, associated with GVM-0, the MTTPM may access PCR-0 to generate a response indicative of GVM-0's configuration. In response to a different TCR associated with GVM-1, also belonging to the "GVM-specific" category, the MTTPM may access PCR-1 and generate a response that indicates GVM-1's configuration. A comparison of the two responses may indicate that the configurations of the two GVMs are not identical. In response to a TCR that does not require access to, or use of, a per-GVM subcomponent, a shared subcomponent may be used to generate a response (such as a cryptographic value that may be generated using a shared key generator subcomponent, a shared hash generator subcomponent, a shared random number generator, a shared sequence number generator, and so on). It is noted that some TCRs may require the access or use of both the shared and per-GVM subcomponents in at least some embodiments, and thus a third category of TCRs may be used in such embodiments (e.g., some TCRs may be classified as "shared-and-GVM-specific" TCRs, others as "shared-only" and others as "GVM-specific-only").

In some embodiments, the per-GVM subcomponents of a MTTPM may comprise only memory locations such as PCRs or EEPROMs, while in other embodiments, at least a portion of the cryptographic processing machinery may be replicated for each GVM as well. For example, in one embodiment, a separate sequence number generator or random number generator may be implemented for each GVM.

In one embodiment, respective encrypted communication channels may be established (e.g., after an exchange of cryptographic secrets by both sides) between at least one of the GVMs of a virtualization host and the host's MTTPM. Using such channels, at least some types of commands/requests may be issued from GVMs to the MTTPM and the corresponding responses may be received, with an assurance that the contents of the requests and responses cannot be decrypted by an intermediary such as a VMC. In such an embodiment, even an attacker that somehow manages to breach the security features of the VMCs may not be able to decipher the messages exchanged between GVMs and the MTTPM.

Example System Environment

Figure 3:
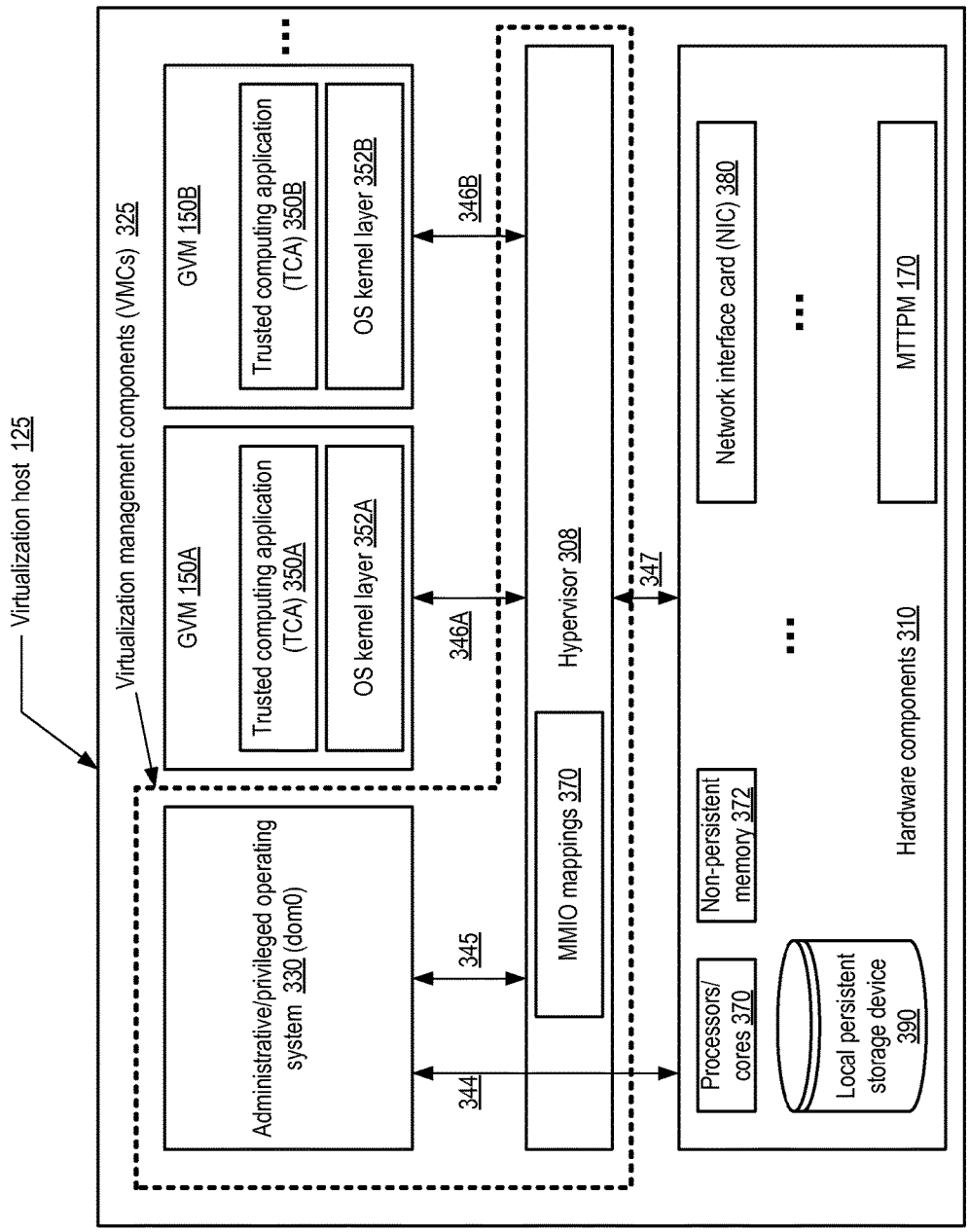
FIG. 3 provides an architectural overview of an MTTPM-equipped virtualization host that may be used at a virtual computing service, according to at least some embodiments.

FIG. 1 illustrates an example system environment in which virtualization hosts of a provider network may be equipped with multi-tenant trusted platform modules (MTTPMs), according to at least some embodiments. As shown, system 100 comprises a provider network 105 at which a virtual computing service 110 may be implemented. The virtual computing service may include a plurality of virtualization hosts (VHs) 125, such as VH 125A and VH 125B. Each VH 125 may be used to instantiate one or more guest virtual machines (GVMs) 150, such as GVM 150A and 150B at VH 125A, and GVM 150K and 150L at VH 125B. A VH may also include additional software components such as a hypervisor and an administrative or privileged virtual machine instance, as discussed below in further detail. On the other side of the hardware-software boundary 122, each VH may include a number of hardware components (examples of which are illustrated in FIG. 3) including a respective MTTPM 170, such as MTTPM 170A at VH 125A and MTTPM 170B at VH 125B.

Each MTTPM 170 may comprise a set of shared subcomponents 185 that can be used by or on behalf of multiple GVMs of the VH 125, as well as a set of per-GVM subcomponents 180 to be used primarily for security-related tasks associated with a single GVM each in the depicted embodiment. For example, MTTPM 170A includes per-GVM subcomponent sets PGS-0 through PGS-15, which can be used for up to 16 GVMs of VH 125A. Different VHs in the provider network 105 may have different performance and memory capacities, and may therefore be usable to launch different numbers of GVMs. In addition, as mentioned earlier, in at least some embodiments the virtual computing service 110 may support several different classes or types of GVMs, including for example "small" versus "large" GVMs, and as a result the maximum number of GVMs supportable at VHs with a given performance capacity may differ depending on the GVM type. In the depicted environment, VH 125B may be capable of hosting up to 32 GVMs, while VH 125A may be capable of hosting up to 16 GVMs. To accommodate variations in the maximum numbers of GVMs at various hosts, in at least some embodiments, MTTPMs with corresponding different levels of per-GVM support may be employed. Thus, while MTTPM 170A at VH 125A has 16 sets of per-GVM subcomponents, MTTPM 170B at VH 125B has 32 sets of per-GVM subcomponents, and can therefore support up to double the number of GVMs as MTTPM 170A. Of course, the actual number of GVMs 150 running at a given VH 125 at any given point in time may be lower than the maximum supported, and as a result not all of the per-GVM subcomponent sets of an MTTPM may be in use at a given point in time.

The virtual computing service 110 may place GVMs of different clients on the same VH in the depicted embodiment. For example, GVM 150A of VH 125A may have been launched by or on behalf of client device 133A of client C1's network 115A, as indicated by arrow 154. GVM 150B, also of VH 150A, may have been launched by or on behalf of client device 133L of client C2's network 115B, as indicated by arrow 157. Configuration information (such as a hash value indicative of the operating system version and/or application stack in use at GVM 150A) pertaining specifically to GVM 150A may be stored in a memory location at PGS-0 of MTTPM 170A, while configuration information pertaining specifically to GVM 150B may be stored in PGS-1. In the depicted embodiment, in order to verify that the GVM is a valid execution environment for client C1's applications, client device 133A may obtain GVM 150A's configuration information from MTTPM 170A, as indicated by arrow 152. The retrieved configuration information may be transmitted to a trusted third party such as a platform attester 182A, as indicated by arrow 153. Similarly, to validate GVM 150B, configuration information pertaining specifically to GVM 150B may be obtained by client device 133L (arrow 155), and passed on to a different platform attester 182B for verification, as indicated by arrow 156. Both clients may use the same third party platform attester (or one or more platform attesters within provider network 105) in some embodiments. It is noted that the client devices may communicate with the MTTPMs via intermediaries (such as virtualization management components at the VHs, which may be configured to handle application programming interface (API) calls issued by client devices) in at least some embodiments, and that the arrows 152 and 155 are not intended to suggest that clients may access MTTPMs directly.

Each of the MTTPMs 170 may be capable of responding to several different types of trusted computing requests (TCRs), including requests or commands to provide per-GVM configuration information as described above, as well as requests for cryptographic data which can be handled using the shared subcomponents 185. In response to a particular TCR, in the depicted embodiment the MTTPM 170 may determine whether the per-GVM subcomponents 180, the shared subcomponents 185, or both types of subcomponents are to be used for the corresponding response. Depending on the nature of the TCR, the appropriate set of subcomponents may then be accessed and used. For GVM-specific configuration information, memory locations such as PCRs (platform configuration registers) in the per-GVM subcomponents may be used in some implementations. In at least one implementation, when queried regarding the configuration of a given GVM, the MTTPM may have to access both GVM-specific subcomponents and shared subcomponents (e.g., other PCRs in which hash values or other information indicative of the VH as a whole). In some embodiments as described below with reference to FIG. 2, the contents of some PCRs and/or other memory locations may be replicated in each per-GVM subcomponent set.

In at least one embodiment, memory-mapped I/O may be used to access at least some MTTPM functions. In some such embodiments a virtualization management component of a VH 125 may generate MMIO address mappings beforehand (e.g., as part of an initialization procedure at the virtualization host) that can later be used for efficient MMIO address translations if needed. Such address translations may be required, for example, to support backward compatibility with trusted computing applications that were originally developed with single-tenant TPMs rather than MTTPMs in view. Such single-tenant applications may utilize a small MMIO address range appropriate for a single-tenant TPM, which may have to be mapped to a larger set of addresses when MTTPMS with per-GVM subcomponent sets are used. In one implementation, the pre-generated mappings may be stored in extended page tables of a memory management unit. In some embodiments, such address mappings may not be generated a priori, and address translation may be performed on the fly as and when needed. In at least one embodiment, memory-mapped I/O may not be used to perform TPM-related operations; instead, for example, other types of I/O primitives may be used.

MTTPM Subcomponents

Figure 2:
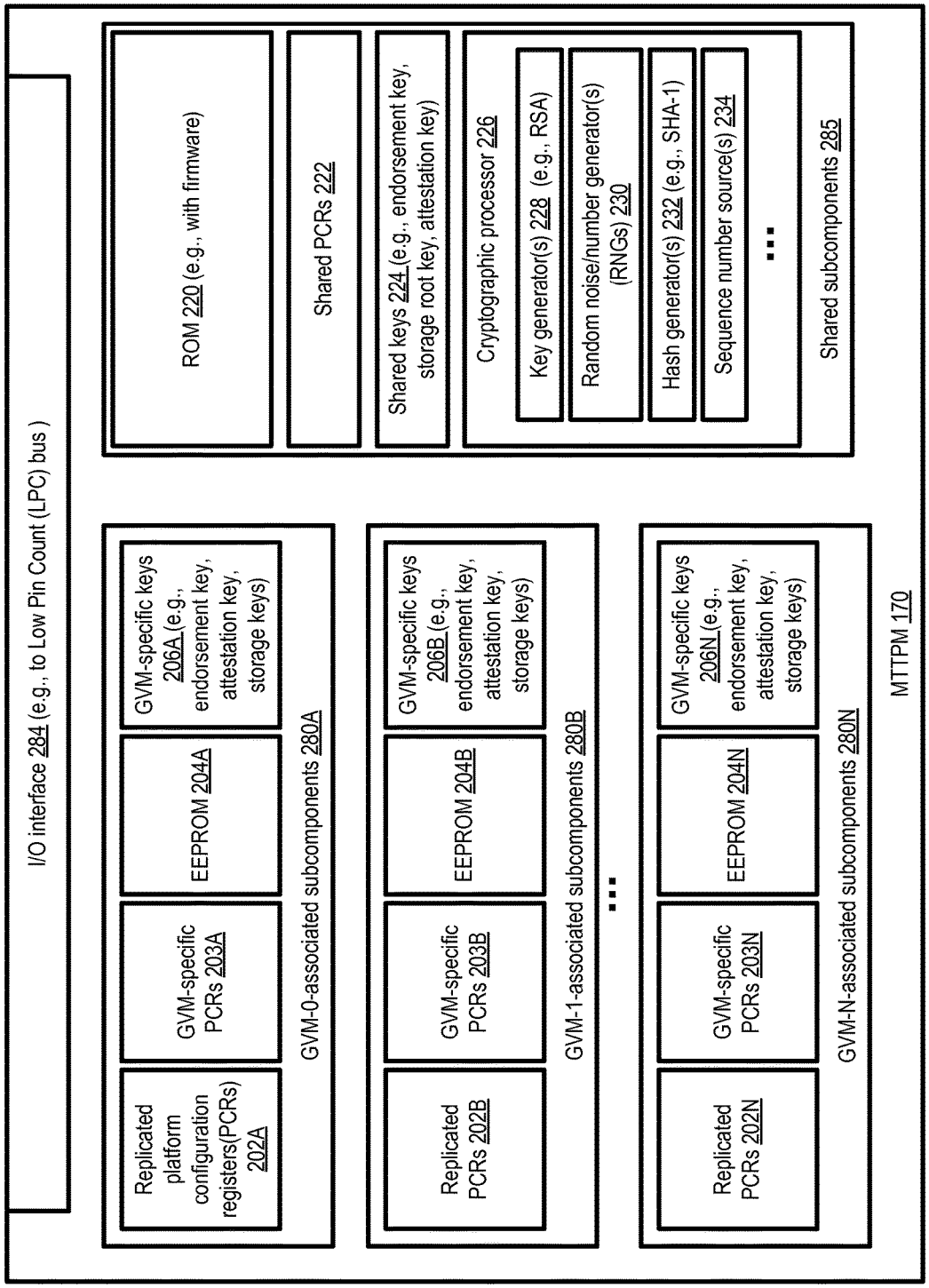
FIG. 2 illustrates example subcomponents of an MTTPM, according to at least some embodiments.

FIG. 2 illustrates example subcomponents of an MTTPM, according to at least some embodiments. As shown, MTTPM 170 comprises N sets of GVM-specific subcomponents 280A-280N, and is therefore capable of supporting up to N different GVMs running on the virtualization host at which the MTTPM is attached. MTTPM 170 also includes shared subcomponents 285 and an I/O interface 284 to a communication bus of the virtualization host. A number of different types of communication buses may be used to attach the MTTPM in different implementations, including, for example, a Low Pin Count (LPC) bus, a PCIe (Peripheral Component Interconnect Express) bus, a Serial Peripheral Interface (SPI) bus, an enhanced Serial Peripheral Interface (eSPI) bus, an Inter-Integrated Circuit (I2C) bus. Other types of interconnects or buses may be used in some implementations. In at least some embodiments, an MTTPM's I/O interface 284 may be compatible with the I/O interface used for single-tenant TPMs which do not have GVM-specific subcomponent sets. This may enable administrators to physically replace a single-tenant TPM with a multi-tenant TPM (or vice versa) without requiring any additional hardware changes in such embodiments.

As shown, the shared subcomponents 285 may include a ROM (read-only memory) region 220 comprising MTTPM firmware. In addition, shared subcomponents 285 may include shared PCRs 222, shared cryptographic keys 224, and a cryptographic processor 226 in the depicted embodiment. Shared PCRs 222 may be used to store signatures for host-wide configuration elements (e.g., values generated by hash generators 232 based on the configuration of the virtualization host's BIOS, hypervisor, administrative or privileged domain operating system stack, and/or other VH components that are shared by or relevant to more than one GVM). Shared keys 224 may include, for example, a host-wide endorsement key, a storage root key, and/or an attestation key. The endorsement key may be an encryption key that is permanently embedded in the MTTPM hardware, generally at the time of manufacture. The endorsement key may not be released outside the MTTPM in at least some embodiments, and a corresponding public key may be used to verify that the MTTPM is genuine. The endorsement key may also be used to encrypt data; using the corresponding public key, the encrypted version may later be decrypted, and the fact that the decryption was performed at the MTTPM may thereby be verified. A storage root key may be used to protect a new key created on behalf of an application running at a GVM or at a virtualization management component in some embodiments, so that the new key cannot be used without the MTTPM. Unlike endorsement keys, which may be created and stored at the time when the MTTPM is manufactured, a storage root key may be created when some entity (such as a provider network administrator) takes ownership of the MTTPM in some implementations. Attestation keys may be utilized in interactions with platform attesters in some embodiments, e.g., to verify that the virtualization host's shared configuration elements meet a client's requirements.

A number of different types of cryptographic values may be obtained using the cryptographic processor 226 in various embodiments. For example, cryptographic-strength keys (such as keys associated with the Rivest-Adleman-Shamir (RSA) algorithm or other similar algorithms) may be obtained using key generators 228. Any of several variants of SHA (secure hash algorithm), such as SHA-1, may be used at hash generators 232 to produce hash values that meet desired quality levels. High quality random noise values or random numbers may be obtained using RNGs (random number/noise generators) 230 in the depicted embodiment. Monotonically increasing sequence numbers may be obtained from sequence number source(s) 234, and may be used as nonce values or for other applications requiring unique identifiers. Other types of cryptographic functions may also or instead be performed using shared subcomponents of the MTTPM in some embodiments. Both symmetric and asymmetric cryptographic engines may be included within the shared subcomponents 285 in some embodiments; in other embodiments, either symmetric or asymmetric cryptographic engines may be included instead of both types of engines. In at least one embodiment, some of the cryptographic machinery illustrated in FIG. 2 may be replicated in the GVM-specific subcomponents as well—e.g., respective sequence number sources or random number generators may be implemented for each GVM.

In the depicted embodiment, the GVM-specific subcomponents for a given GVM may include at least two types of PCRs, an EEPROM, and GVM-specific keys. GVM-specific PCRs 203, such as 203A-203N, may be used to store the configuration signatures that may differ from one GVM to another, such as the version of the operating system stack, the applications installed, etc. Some of the contents of the shared PCRs 222 may be copied into a respective set of replicated PCRs 202 (e.g., 202A-202N) in the depicted embodiment, which may simplify the task of mapping requests formatted for single-tenant TPMs into MTTPM requests. For example, consider a scenario in which a single-tenant TPM specification defines the types of configuration information to be stored in each of 24 PCRs, each comprising 160 bits. Since some of the configuration elements represented in the 24 PCRS (such as the BIOS, the hypervisor, etc.) may be shared by multiple GVMs, and some may be specific to a given GVM, replicating the shared configuration information so that each per-GVM subcomponent set appears to have 24 PCRs (counting both the GVM-specific and replicated PCRs) may simplify the implementation of the MTTPM firmware and associated software. GVM-specific versions 206 (e.g., 206A-206N) of at least some of the types of keys that were discussed above (such as attestation keys, endorsement keys, or storage root keys) may also be stored in the per-GVM subcomponents sections in various embodiments.

Such GVM-specific keys may be used in some embodiments to generate cryptographically-verifiable artifacts (such as digital signatures) that can be used to uniquely identify or authenticate a given GVM. Such GVM-specific keys and artifacts may be used to verify that a message whose sender claims to have sent the message from a particular GVM was indeed generated at that particular GVM. For example, a private key unique to a particular GVM such as GVM-0 (and not releasable outside the MTTPM, or accessible by any other GVM than GVM-0) may be stored in GVM-0's per-GVM subcomponents 280A. GVM-0's private key may be used to generate a digital signature (or some other encrypted artifact), which can only be decrypted using a public key for GVM-0, where the public key has been validated and/or published by a trusted certificate authority. Similarly, GVM-1 may use a private key that is only accessible to it and is stored in GVM-1's subcomponents 280B to generate an encrypted artifact, which can only be decrypted using a public key specific to GVM-1 and validated by a trusted certificate authority (which may or may not be the same authority validating GVM-0's public key).

In at least one embodiment, per-GVM subcomponents may be used to ensure, before a particular operation is performed at or by a given GVM, that the state of the GVM-specific configuration (as indicated, for example, in GVM-specific PCRs 203, or in the combination of replicated PCRs 202 and GVM-specific PCRs 203) has not changed since an earlier point in time. For example, a client may install a particular application App1 on GVM-0 at a point in time when the configuration of GVM-0 was in a state S1, and may wish to ensure, each time that App1 is executed, that the GVM-0 configuration has not changed from S1. This may be accomplished using the following approach in some embodiments. First, as described above, per-GVM PCRs (either by themselves or in combination with some PCRs used for host-wide state information) may be used to store hash values that represent the state S1. Then, a selected set of data (e.g., an authentication token or policy document that is needed to run App1) may be "bound" and "sealed" using GVM-0's per-GVM subcomponents 280A. The term "bound data" may be used herein to describe data that has been encrypted using a key (e.g., stored in the GVM-specific subcomponent of a particular GVM such as GVM-0) which is part of the corresponding GVM's root of trust for storage. Since the root of trust may differ for different GVMs in an embodiment in which MTTPMs are used, the bound data may only be decrypted from the corresponding GVM (in this example, GVM-0) in such an embodiment. "Sealing" is an additional step that may be performed in at least one embodiment, in which the contents of a selected set (or all) of the PCRs 202A and/or 203A of GVM-0 may be recorded in the per-GVM subcomponent 280A as of the time that the data set is bound. In addition to the restrictions associated with decrypting bound data, sealed data may only be decrypted when the selected PCRs have the same value as they had at the time of encryption. Thus, the tokens or documents required to run App1 may only be decrypted if the configuration state S1 has not changed. Using a combination of GVM-specific binding and GVM-specific sealing, requirements for verifying GVM configuration prior to various selected operations may thus be enforced in at least some embodiments. In some embodiments, the binding step may not necessarily use GVM-specific keys, while the sealing step may use GVM-specific state information.

Respective EEPROMs 204 (e.g., 204A-204N) may be included for each GVM in at least some embodiments. In one embodiment, at least a subset of the PCRs and/or the keys may be stored within the EEPROMs, while other security-related objects may be stored in the EEPROMS in different embodiments. It is noted that not all the different elements illustrated in FIG. 2 may be included in an MTTPM in at least some embodiments.

Virtualization Host Architecture

FIG. 3 provides an architectural overview of an MTTPM-equipped virtualization host that may be used at a virtual computing service, according to at least some embodiments. As shown, the virtualization host 125 may comprise a plurality of hardware components 310, which may include, for example, some number of processing cores or processors 370, at least one non-persistent memory 372 which may be referred to as a main memory, one or more local persistent storage devices 390 such as disks (which may include rotating disks and/or solid state disks), and one or more network interface cards (NICs) 380. Other non-persistent memory locations may also be available at the hardware components layer 310 in at least some embodiments, such as various levels of processor cache, registers, and the like. A multi-tenant trusted platform module 170 may also be incorporated within or attached to the virtualization host in the depicted embodiment. The MTTPM itself may comprise various memory locations as discussed above with reference to FIG. 2. Peripherals such as one or more monitors, mice, and the like (not shown in FIG. 3) may also be attached to the virtualization host in some implementations.

Various hardware layer resources 310 may be virtualized (e.g., presented to several GVMs 150 booted or launched at the virtualization host 125 as though each of the instances had exclusive access to the resources) with the help of a virtualization management software stack that comprises a hypervisor 308 and/or an administrative instance of an operating system 330 in the depicted embodiment. The hypervisor and/or the administrative operating system instance may be referred to as virtualization management components (VMCs) 325 herein. The administrative instance of the operating system may be referred to as a "privileged domain" labeled "domain 0" or "dom0" in some implementations, while respective operating systems established for each of the GVMs 150 may be referred to as "unprivileged domains" (labeled "domU"), "guest operating systems", or "guest domains". When a hardware component is to be utilized by a GVM 150, e.g., due to an operation requested by the operating system kernel layer 352 (such as 352A or 352B) or by an application running on top of the operating system, the hypervisor 308 may typically act as an intermediary between the GVM and the hardware component, as indicated by the arrows 346A and 346B in the depicted embodiment. Applications that utilize the functionality of the MTTPM may be referred to as trusted computing applications (TCAs) 350, such as TCA 350A at GVM 150A and TCA 350B at GVM 150B. In some cases, depending for example on the programmatic interfaces being used, both the hypervisor and the administrative operating system instance 330 may be intermediaries between the GVM and the hardware. For example, the request path for an operation may flow as follows: GVM→hypervisor→dom0→hypervisor→hardware, and the response may be provided to the GVM using the reverse path. In some implementations, dom0 may be able to directly access one or more types of hardware components (as indicated by arrow 344); other interactions between dom0 and the hardware may pass through the hypervisor (as indicated collectively by arrows 345 and 347).

In the depicted embodiment, memory-mapped I/O addresses may be used to request MTTPM operations. A set of MMIO mappings 370 may be generated by a VMC such as the hypervisor 370, and used to translate the target MMIO addresses indicated in a request directed to the MTTPM as discussed above. Such a mapping may be used for example to maintain compatibility with applications and operating system kernels that were designed with single-tenant TPMS in view, and therefore use a smaller range of MMIO addresses (such as a range defined by a single-tenant TPM vendor or by a standard specification for single-tenant TPMs) than are to be used for MTTPMs.

Hash Measurements of Execution Environments

Figure 4:
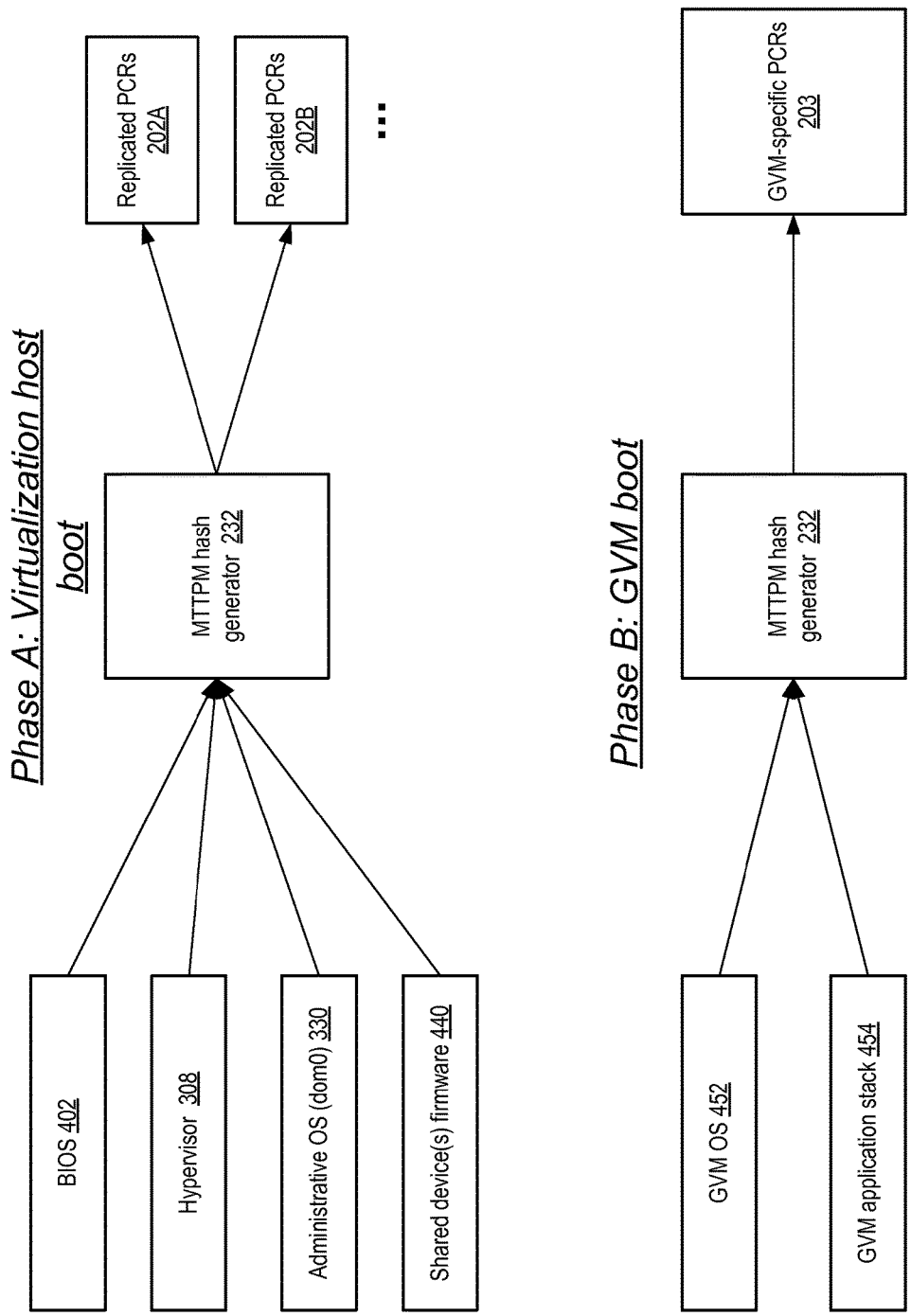
FIG. 4 illustrates examples of input data sources that may be used by an MTTPM to generate hash values representing execution environments, according to at least some embodiments.

FIG. 4 illustrates examples of input data sources that may be used by an MTTPM to generate hash values representing execution environments, according to at least some embodiments. Such hash values or signatures may be generated during different phases of initializing the virtualization host and the GVMs. In phase A, during a virtualization host boot process, respective hash signatures corresponding to the BIOS 402, the hypervisor 308, the dom0 or administrative operating system 330, and/or firmware associated with other shared hardware devices 440 of the host may be generated using the MTTPM's hash generator 232. In some embodiments in which MTTPM PCRs for shared configuration information are replicated for multiple GVMs, the signature values generated during phase A may be stored in such replicated PCRs 202.

Later, after the host has booted, one or more GVMs may be booted or launched, and phase B of the signature generation may be implemented. In phase B, the GVM operating system 452 and/or installed application stack 454 may serve as input to the hash generator 232, and corresponding signatures may be stored in the GVM-specific PCRs associated with the GVM that is being booted. To obtain a complete signature of the configuration of the GVM, the signatures obtained during both phases may be used together in at least some embodiments. The signatures (either a combined signature computed from the separate signatures for the different layers, or individual signatures for each of the configuration layers) may then be compared with a set of pre-approved pre-generated hash values, which may be referred to as "attested" hash values, to determine whether the execution environment being considered matches an approved configuration. In at least some embodiments, the hash functions being used to generate the signatures may be selected in such a way that if even one byte of the input to the hash generator has been changed with respect to the reference or "attested" configurations, the hash value produced may not match the reference values. In at least some embodiments, the pre-approved hash values corresponding to at least some resource stacks of interest may be obtained by a client, so that the verification of the resource stacks may be performed by the client without interactions with third parties. In other embodiments, trusted attesters or certifiers of resource stacks may be used. Such attesters may be accessible outside the provider network or within the provider network in different embodiments. In at least some embodiments, a hash value generated by a MTTPM earlier (e.g., as part of the attestation process for the virtualization host or for a GVM) may be transmitted to the virtualization host with an encrypted set of credentials, and may be used to re-check that the virtualization host's resource stack has not been tampered with since the hash value was first generated.

MMIO Address Mappings

Figure 5:
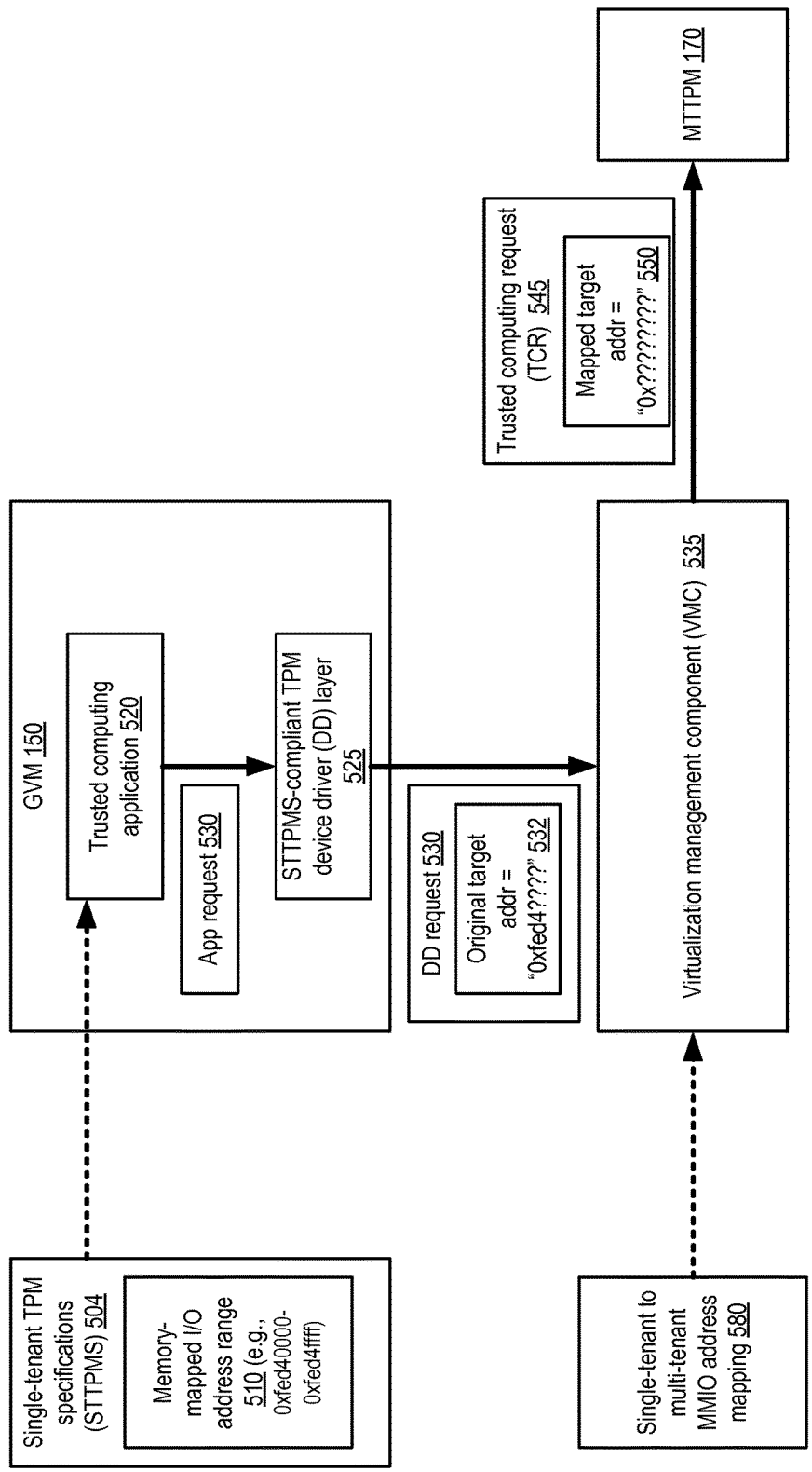
FIG. 5 illustrates an example of a use of memory-mapped I/O (MMIO) address mappings for trusted computing requests, according to at least some embodiments.

FIG. 5 illustrates an example of a use of memory-mapped I/O (MMIO) address mappings for trusted computing requests, according to at least some embodiments. In the depicted embodiment, at least some applications and/or operating system components that require trusted computing support (e.g., applications or operating systems that may need TPM-generated keys or other cryptographic assets) may initially be developed in accordance with a single-tenant TPM specification (STTPMS) 504. For example, a trusted computing application 520 and/or a TPM device driver layer 525 of a guest virtual machine may both be compliant with STTPMS 504. STTPMS 504 may itself be compliant with a trusted computing standard developed by an industry group or consortium in some cases. The single-tenant TPM standard may define a range of MMIO addresses that are to be indicated as target addresses in trusted computing requests submitted by the device driver layer 525. For example, when trusted computing application 520 submits an application-level request 530 which may require the use of a TPM, the device driver (DD) layer 525 may use one or more MMIO target addresses between 0xfed40000 and 0xfed4ffff in the corresponding DD request 530 in the depicted embodiment. Such MMIO addresses may be used for read operations (e.g., to read contents of PCRs or other TPM memory locations), write operations (e.g., to store a value in a particular TPM memory location) and/or for other types of cryptographic computation operations (e.g., to obtain a key or hash value) in various embodiments.

At hosts at which single-tenant TPMs are being used, the target MMIO addresses indicated by an STTPMS-compliant DD layer 525 may be used without any remapping. However, since a multi-tenant TPM 170 comprises respective groups of GVM-specific resources for several different GVMs, the range of MMIO addresses indicated in the STTPMS may not be large enough to cover the complete set of GVM-specific resources in embodiments in which MTTPMs are being used. Thus, in order to accommodate requests that are compliant with the STTPMS 504, without requiring device drivers and/or trusted computing applications to be modified, an intermediary layer may have to translate the target MMIO addresses in the DD requests 530. In the depicted embodiment, a virtualization management component (VMC) 535 (such as a hypervisor or an administrative domain operating system) may perform such address translations using mappings 580. Given a combination of (a) the original target address 532 in a DD layer request 530 and (b) an identifier of the particular GVM at which the DD layer request 530 was generated, the mappings 580 may be used to obtain the corresponding mapped target address 550 that is to be indicated in a trusted computing request 545 to be directed to the MTTPM 170. In at least some embodiments, the MMIO address mappings 580 between single-tenant and multi-tenant address ranges may be stored in extended page tables of a memory management unit of the host at which the GVMs and the VMC run.

Using the mappings 580, a VMC may translate DD layer requests which indicate the same target MMIO address, received from different GVMs at an instance host, into the appropriate TCRs sent to the MTTPM. For example, a first DD request DDReq0 from GVM0 with an STTPMS-compliant target MMIO address Addr0 may be intercepted or received at the VMC 535, and a second DD request DDReq1 from GVM1 with the same STTPMS-compliant target MMIO address Addr0 may also be intercepted or received at VMC 535. Using the combination of the GVM identifier and the original target addresses, different mapped target addresses MAddr0 and MAddr1 may be determined by the VMC for the two corresponding TCRs, TCR0 (whose address Maddr0 is obtained using the combination (GVM0, Addr1) as input for mapping) and TCR1 (whose address Maddr1 is obtained using the combination (GVM1, Addr0) as input). It is noted that in at least some embodiments, the computations for address translations needed to support STTPMS-compliant applications and/or device drivers may be performed on demand (after the corresponding DD layer requests are received at an intermediary such as a VMC 535), e.g., without accessing previously-generated mappings 580.

Encrypted Channels Between GVMs and MTTPMs

Figure 6:
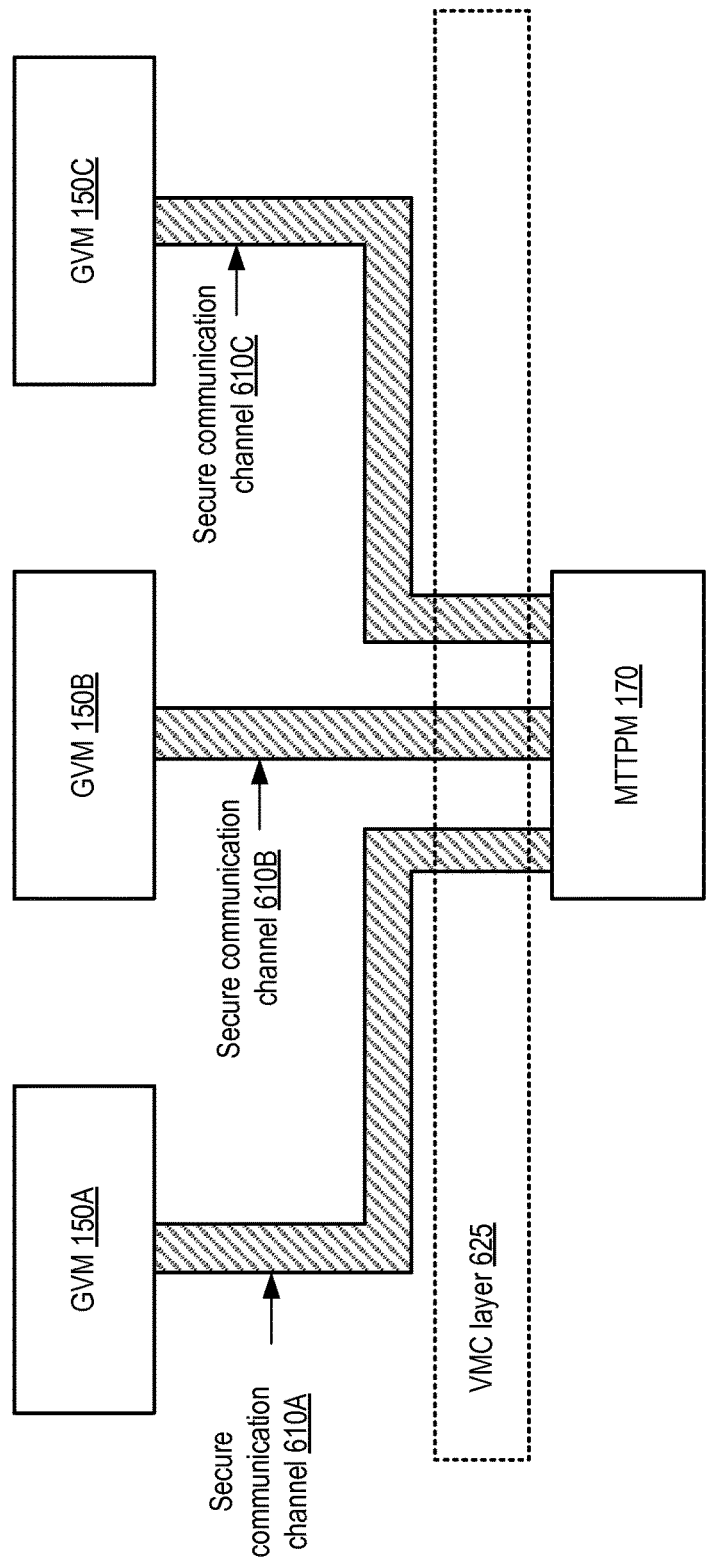
FIG. 6 illustrates an example of the use of secure communication channels between guest virtual machines and an MTTPM, according to at least some embodiments.

FIG. 6 illustrates an example of the use of secure communication channels between guest virtual machines and an MTTPM, according to at least some embodiments. Such channels may be set up to provide an additional layer of security, e.g., in order to prevent an attacker that is somehow able to penetrate the VMC layer of an instance host from being able to determine the contents of TPM-related requests and responses. Encrypted and/or authenticated messages may be sent via such secure channels in at least some embodiments.

In the depicted embodiment, three GVMs 150A, 150B and 150C running at a particular instance host have established respective secure communication channels 610A, 610B and 610C with MTTPM 170. To set up secure channel 610A, GVM 150A may have exchanged cryptographic secrets with the MTTPM; similarly, for each of the other secure channels 610B and 610C, a respective exchange of secret values between the corresponding GVM and the MTTPM may have been required. After the secure channels 610 have been set up, communications between a given GVM 150 and the MTTPM 170 may not be decrypted by or at an intermediary layer such as the VMC 625 in the depicted embodiment. In some embodiments, in order to achieve the additional layer of security illustrated in FIG. 6, the TPM device driver layer at the GVMs may be designed to be MTTPM-aware, and determine the target addresses for trusted computing requests itself instead of relying on intermediaries such as the VMC to perform address translations of the kind illustrated in FIG. 5.

Methods for Utilizing Multi-Tenant TPMs

Figure 7:
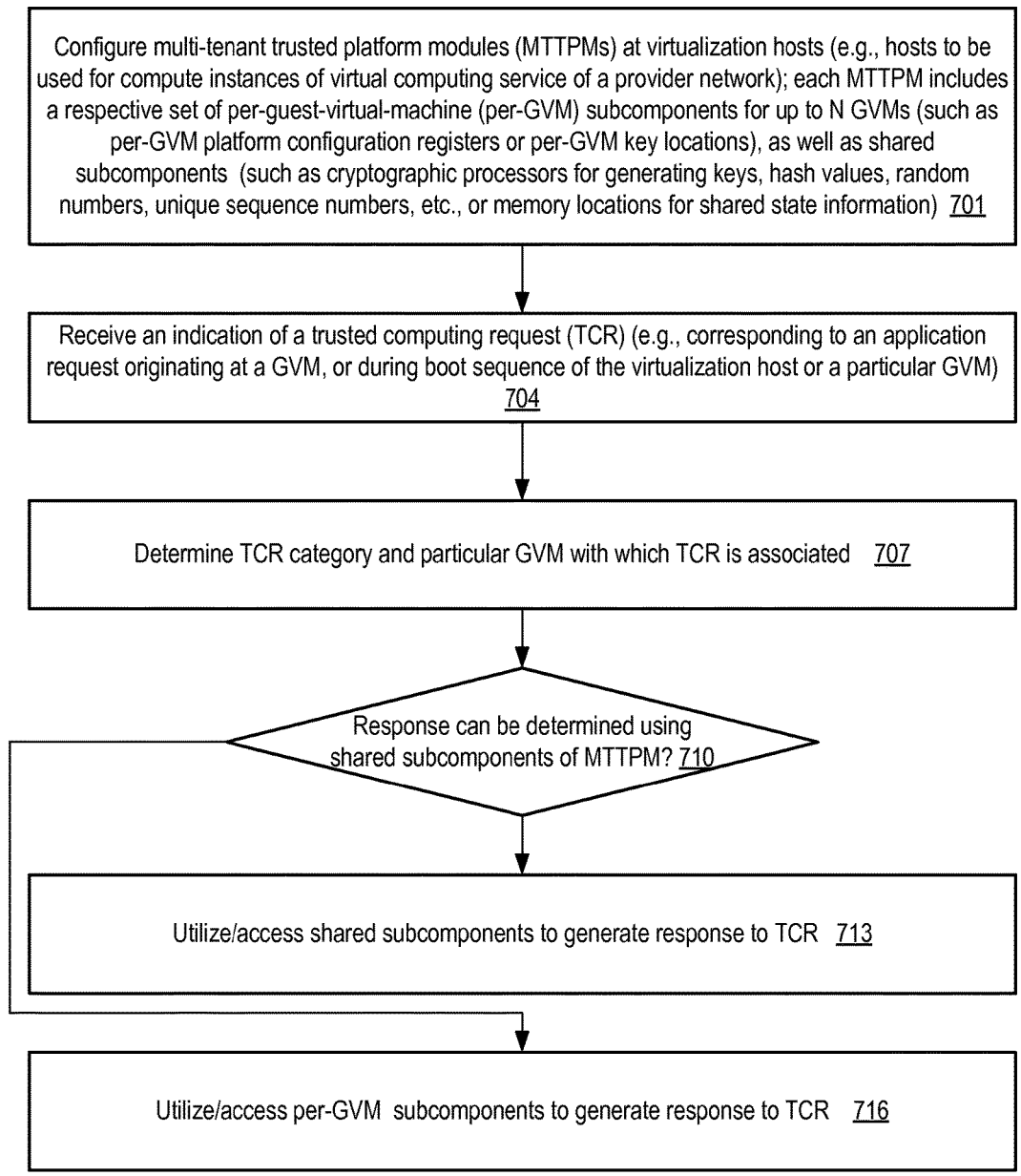
FIG. 7 is a flow diagram illustrating aspects of operations that may be performed to respond to trusted computing requests at an MTTPM-equipped virtualization host, according to at least some embodiments.

FIG. 7 is a flow diagram illustrating aspects of operations that may be performed to respond to trusted computing requests at an MTTPM-equipped virtualization host, according to at least some embodiments. As shown in element 701, a number of virtualization hosts may be configured with respective MTTPMs in some embodiments. An MTTPM at a given virtualization host may comprise a respective collection of one or more GVM-specific or per-GVM subcomponents for up to N different GVMs that may be instantiated at the host. In addition, in at least some embodiments, a collection of one or more shared subcomponents that may each be used to respond to requests from multiple GVMs may be included in an MTTPM. The per-GVM subcomponents may include, for example, respective sets of memory locations such as platform configuration registers or PCRs to be used to store configuration information pertaining to the corresponding GVM, or respective EEPROMs that can be used for GVM-specific keys. The shared subcomponents may include, for example, cryptographic processing elements for generating keys, hash values, and the like. In some implementations, a set of PCRs or other memory locations containing host-wide configuration information may be replicated within one or more of the per-GVM subcomponent collections. In at least one implementation, one or more cryptographic processors may be included among the per-GVM subcomponent collections. In some embodiment, an MTTPM may comprise only per-GVM subcomponents (e.g., none of the subcomponents of the MTTPM may be intended for shared use on behalf of more than one GVM). The virtualization hosts may be resources of a virtualized computing service of a provider network in some embodiments, and the GVMs in such embodiments may represent units of computational capacity that are assigned/allocated to clients of the virtualized computing service. Thus, at least in principle, the applications of several different clients may be running at respective GVMs at a single instance host, and the use of the MTTPM may enable trusted computing operations to be performed on behalf of the different clients with a greater level of isolation than may have been possible if single-tenant TPMs were used.

In general, in embodiments in which MTTPMs are used, trusted computing requests (e.g., requests submitted to the MTTPMs by a virtualization management layer of the instance hosts, as well as higher-level requests generated by client applications, operation system components such as TPM device drivers, and so on) may be classified into respective categories, depending on whether the requests can be satisfied using the shared MTTPM subcomponents or whether GVM-specific resources have to be used. As shown in element 704, an indication of a trusted computing request may be received at an MTTPM. The TCR may correspond to an application-level request generated at a GVM in some cases, or may be submitted during a not sequence or initialization sequence of the virtualization host or a GVM in other cases (e.g., an indication of the TCR may be received at an MTTPM before any GVM is launched at the virtualization host). The category of the TCR, and the particular GVM with which the TCR is associated (if any) may be determined (element 704). If a response to the TCR can be obtained using shared subcomponents of the MTTPM (as determined in element 710), one or more of the shared subcomponents may be accessed or utilized to generate the response (element 713). If the response requires the use of per-GVM subcomponents, the appropriate set of GVM-specific subcomponents may be used (element 716). By accessing respective per-GVM memory location sets in response to TCRs of a per-GVM category, for example, it may be possible in some embodiments to determine whether the configuration (e.g., operating system version, application stack, etc.) of one GVM differs from another GVM at the same virtualization host. Similarly, different GVMs may store results of cryptographic operations (e.g., keys, cryptographic-strength hash values, and the like) in respective TPM locations of their per-GVM subcomponents. At the same time, in some embodiments, the shared subcomponents of an MTTPM may be used by various GVMs as needed, e.g., for cryptographic computations, without incurring the cost of replication the complete cryptographic processing machinery for each GVM. It is noted that for some TCRs, both shared as well as per-GVM subcomponents may be used.

In some embodiments, various components at an instance host, such as the client applications and/or GVM operating systems may have been designed and developed in accordance with a single-tenant TPM specification or standard. In one such embodiment, a set of addresses to be used as parameters or targets for trusted computing requests may have been indicated in the single-tenant specification. In order to minimize the software changes required to support MTTPMs, in some embodiments mappings between the specification's address ranges (which are intended for single-tenant TPMs) and the actual MTTPM address ranges (which may be larger than the specification's address range) may be generated and stored by intermediaries such as virtualization management components at the virtualization hosts. For example, a hypervisor or privileged-domain operating system may store such mappings in some implementations, enabling efficient low-overhead address translations to be performed. In other embodiments, such address translations may be performed without using pre-generated mappings. In some embodiments, memory mapped I/O (MMIO) requests may be used to implement trusted computing requests, and MMIO address mappings may be stored in extended page tables.

Figure 8:
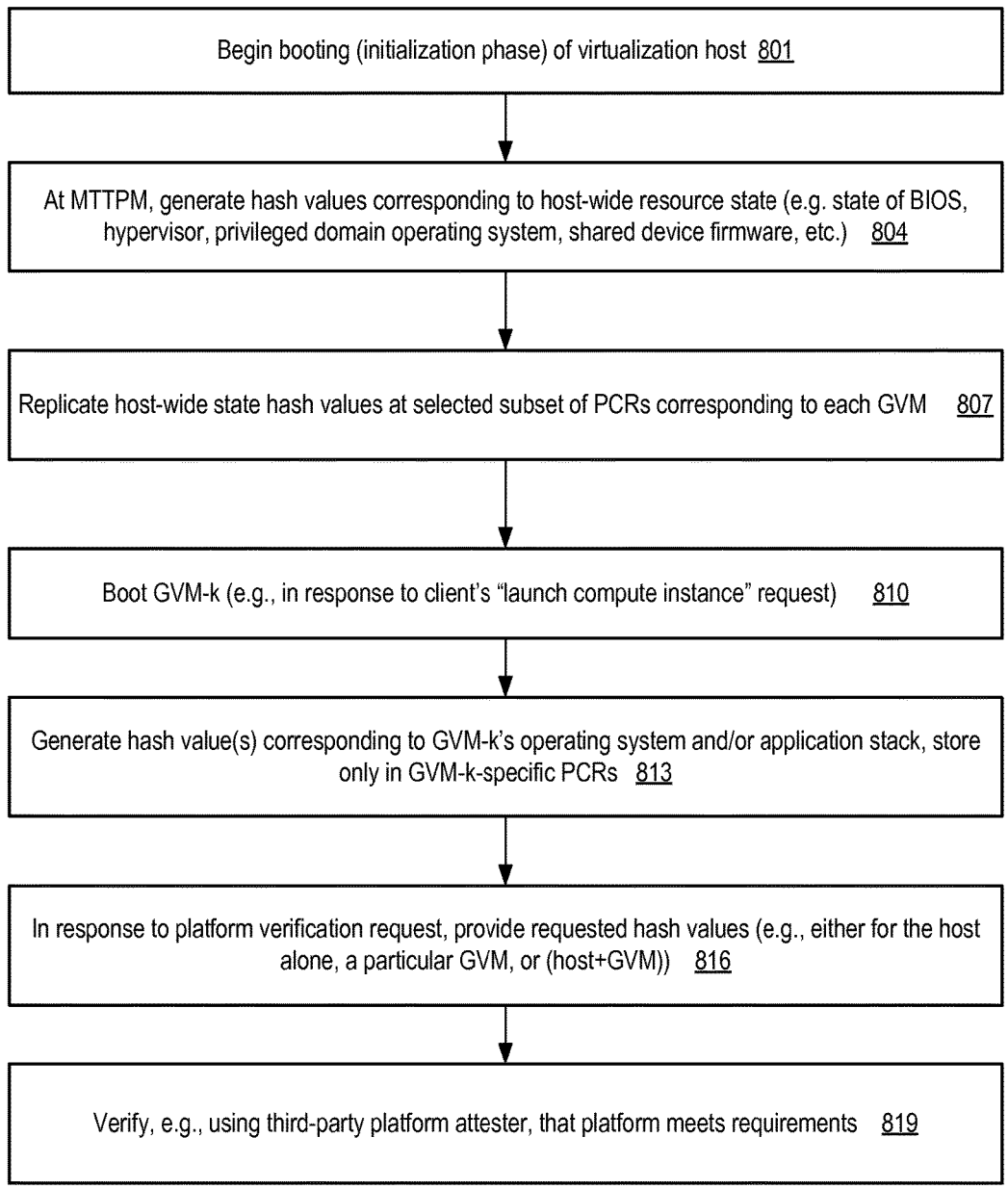
FIG. 8 is a flow diagram illustrating aspects of platform verification that may be performed in an environment in which MTTPMs are used, according to at least some embodiments.

In some embodiments, MTTPMs may be used for verifying that a given execution platform meets desired security criteria. FIG. 8 is a flow diagram illustrating aspects of platform verification that may be performed in an environment in which MTTPMs are used, according to at least some embodiments. As shown in element 801, the booting or initialization of a given MTTPM-equipped virtualization host may be begun. At the MTTPM, respective hash values corresponding to the configuration state of one or more host-wide resources (such as the BIOS, the hypervisor, the privileged-domain operating system, or the firmware of hardware resources that are to be shared among GVMs) may be generated during the initialization phase (element 804).

The hash values or signatures corresponding to host-wide resources may be replicated at a selected subset of PCRs (platform configuration registers) in the per-GVM subcomponents of the MTTPM in the depicted embodiment (element 807). In other embodiments, PCR contents may not be replicated: e.g., one shared set of PCRs may be used for global host-wide resource signatures, while GVM-specific configuration signatures may be stored in per-GVM PCRs.

After the virtualization host itself has completed its boot or initialization phase, a particular GVM (e.g., GVM-k) may be instantiated at the host, e.g., in response to a "launch compute instance" request from a client of a virtualized computing service for which the host is being used (element 810). Respective hash values or signatures corresponding to GVM-k may be generated and stored in the MTTPM's per-GVM subcomponents designated for GVM-k (element 813). Such signatures may, for example, uniquely identify the operating system installed for GVM-k and/or portions of the application stack of GVM-k. In response to a platform verification request, for example, the requested hash values corresponding to the virtualization host alone, a given GVM alone, or the combination of the virtualization host and a particular GVM, may be provided (element 816). The provided signatures may be used to verify that the execution platform meets a client's security requirements. For example, a trusted third-party platform attester may be used in some embodiments, as indicated in element 819, to ensure that the signature(s) match those expected to be produced for an environment with the software/hardware/firmware components desired by the client. In addition to the types of configuration verification operations illustrated in FIG. 8, per-GVM subcomponents may also be used for a variety of other purposes. For example, as described above, per-GVM subcomponents may be used for cryptographically verifying GVM identities and/or for ensuring that particular operations are only performed if a GVM's configuration state has not changed since a particular data set was encrypted or "bound" using an MTTPM.

It is noted that in various embodiments, operations other than those illustrated in the flow diagrams of FIG. 7 and FIG. 8 may be used to implement at least some of the techniques for supporting multi-tenant trusted platform modules. Some of the operations shown may not be implemented in some embodiments, may be implemented in a different order than illustrated in FIG. 7 or FIG. 8, or in parallel rather than sequentially.

Use Cases

The techniques described above, of configuring virtualization hosts with multi-tenant trusted platform modules, may be used in a variety of environments. Many modern applications and protocols that require high levels of security may be run using hosts that are shared among multiple clients. At least some clients of virtual computing services may wish to obtain higher levels of hardware-based security than may be achievable when single-tenant TPMs are used, and such security requirements may be met using MTTPMs that include per-GVM subcomponents. Using at least some per-GVM subcomponents, for example, the configuration states of individual GVMs may be validated, identities of GVMs may be cryptographically verified, and/or specified applications or operations may only be permitted to proceed at a GVM if the GVM's configuration has not changed since a selected data set was encrypted or "bound". Furthermore, client applications and even the operating systems used at GVMs, many of which may have been designed and developed in accordance with single-tenant TPM standards or specifications, may not need to be modified if the kinds of address translation techniques described herein are used.

Illustrative Computer System

Figure 9:
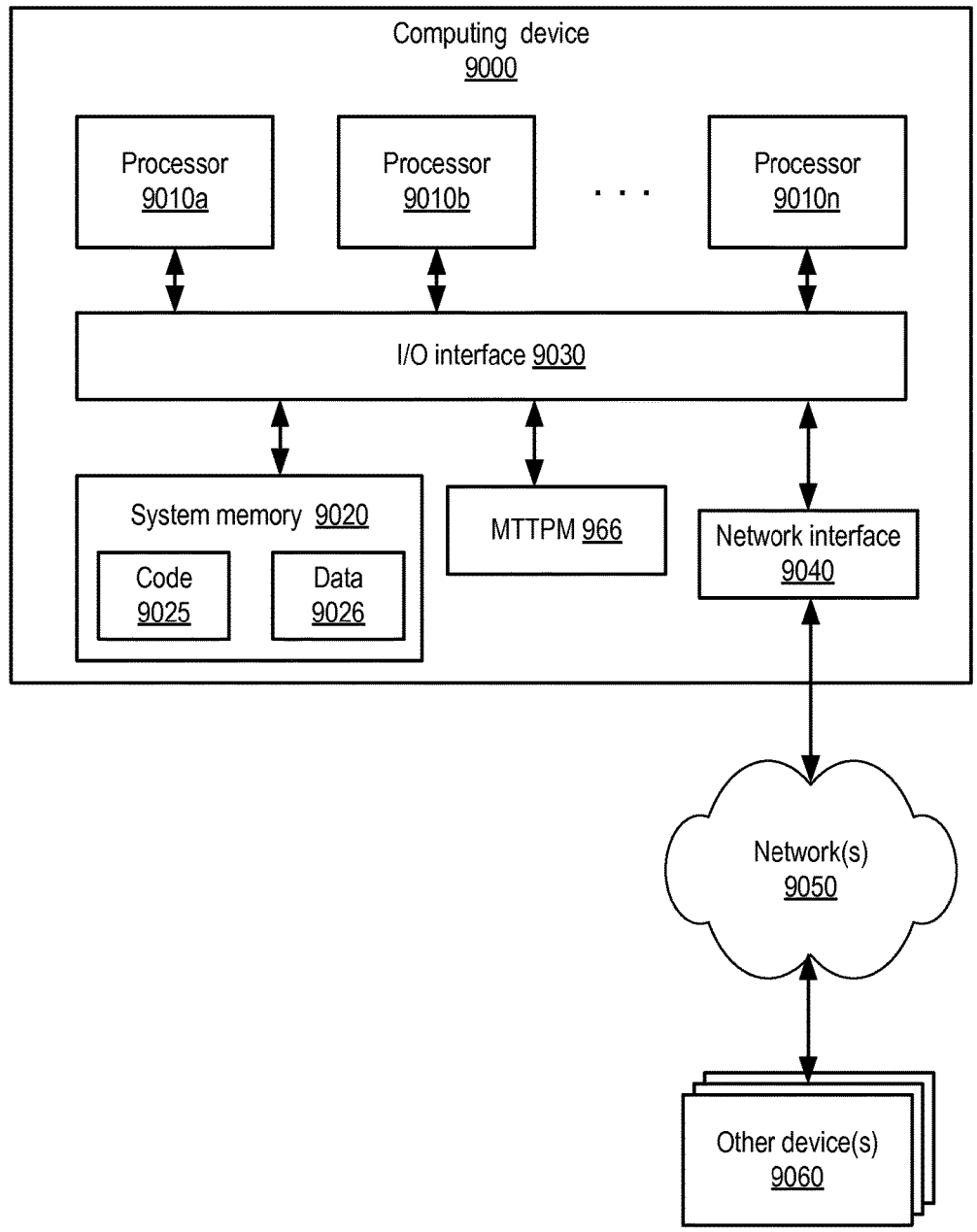
FIG. 9 is a block diagram illustrating an example computing device that may be used in at least some embodiments.

In at least some embodiments, a server that implements one or more of the techniques described above for supporting multi-tenant trusted platform modules may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including MTTPM 966, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    instantiating, by one or more virtualization management components, a plurality of guest virtual machines (GVMs) at a virtualization host, including a first GVM and a second GVM, wherein the virtualization host comprises a multi-tenant trusted platform module (MTTPM) comprising a plurality of per-GVM subcomponents, including a first per-GVM memory location set corresponding to the first GVM and a second per-GVM memory location set corresponding to the second GVM, and one or more shared subcomponents usable by the plurality of GVMs;
    receiving, at the MTTPM, an indication of first trusted computing request (TCR) associated with the first GVM;
    accessing, at the MTTPM, a first memory location of the first per-GVM memory location set to generate a first response to the first TCR indicating a configuration of the first GVM;
    receiving, at the MTTPM, an indication of a second TCR associated with the second GVM;
    accessing, at the MTTPM, a second memory location of the second per-GVM memory location set to generate a second response to the second TCR indicating a different configuration of the second GVM;
    receiving, at the MTTPM, an indication of a third TCR originating at a particular GVM of the plurality of GVMs; and
    generating, at the MTTPM, a response to the third TCR using at least a particular shared subcomponent of the one or more shared components and indicating an output of a cryptographic processor of the MTTPM.

2. The method as recited in claim 1 wherein the first per-GVM memory location set includes one or more of: (a) a Platform Configuration Register (PCR) to be used for a GVM-specific configuration entry, (b) a PCR to be used to replicate a configuration entry pertaining to the plurality of GVMs, (c) an electrically erasable programmable read-only memory (EEPROM), (d) an attestation identity key (AIK) location, (e) a storage key location, or (f) an endorsement key location.

3. The method as recited in claim 1, further comprising:
    receiving, at the MTTPM, an indication of a fourth TCR originating at another GVM of the plurality of GVMs; and
    generating, at the MTTPM, a response to the fourth TCR using at least a particular shared subcomponent of the one or more shared components and a particular per-GVM subcomponent of the plurality of per-GVM subcomponents.

4. The method as recited in claim 1, wherein the particular shared subcomponent comprises one or more of: (a) a random noise generator, (b) a cryptographic key generator, (c) a hash generator, (d) a symmetric cryptographic engine, (e) an asymmetric cryptographic engine, (f) an endorsement key location, (g) a sequence number source, (h) a storage root key location, or (i) a PCR to be used for an entry indicative of shared configuration information of the plurality of GVMs.

5. The method as recited in claim 1, further comprising:
    storing, by a particular virtualization management component of the one or more virtualization management components, a mapping between a first set of memory-mapped I/O (MMIO) addresses, and a second set of MMIO addresses;

identifying, at the first GVM, a first MMIO address of the first set of MMIO addresses as a target address of the first TCR; and determining, based at least in part on (a) an indication that the first TCR was generated at the first GVM and (b) the mapping at the particular virtualization management component, a second MMIO address of the second set of MMIO addresses to which the first MMIO address is mapped, wherein the second MMIO address corresponds to the first memory location of the first per-GVM memory location set.

6. The method as recited in claim 5, wherein at least a portion of the mapping is stored in an extended page table of a memory management unit of the virtualization host.

7. The method as recited in claim 5, wherein the first set of MMIO addresses is assigned for implementing trusted computing operations in accordance with a specification for single-tenant trusted platform modules.

8. The method as recited in claim 5, further comprising:
identifying, at the second GVM, the particular MMIO address of the first set of MMIO addresses as a target address of the second TCR; and determining, based at least in part on (a) an indication that the second TCR was generated at the second GVM and (b) the mapping at the particular virtualization management component, a third MMIO address of the second set of MMIO addresses, wherein the third MMIO address corresponds to the second memory location of the second per-GVM memory location set.

9. The method as recited in claim 5, further comprising:
identifying, at the first GVM, a first MMIO address as a target address of the first TCR; and determining, without utilizing a previously stored mapping at a particular virtualization management component of the one or more virtualization management components, a second MMIO address to which the first MMIO address is to be translated, wherein the second MMIO address corresponds to the first memory location of the first per-GVM memory location set.

10. The method as recited in claim 7, further comprising:
establishing, based at least in part on an exchange of one or more cryptographic secret values between the first GVM and the MTTPM, a communication channel between the first GVM and the MTTPM, wherein the communication channel is used for one or more of: (a) encrypted messages between the first GVM and the MTTPM or (b) authenticated messages between the first GVM and the MTTPM;

wherein said indication of the first TCR is received at the MTTPM via the communication channel.

11. The method as recited in claim 7, further comprising:
replicating, at the first and second per-GVM memory location sets during an initialization phase of the virtualization host, respective hash values indicative of one or more of: (a) a BIOS (Basic Input/Output System) configuration of the virtualization host; (b) a hypervisor of the virtualization host, or (c) a privileged domain operating system configuration of the virtualization host;

storing, at the first per-GVM memory location set, a hash value indicative of a configuration of the first GVM; and storing, at the second per-GVM memory location set, a hash value indicative of a configuration of the second GVM.

12. The method as recited in claim 7, further comprising:
generating, using a private key stored in the first per-GVM memory location set, an encrypted artifact indicative of an identity of the first GVM; and verifying, at an entity external to the first GVM, that the encrypted artifact was generated at the first GVM, wherein said verifying comprises using a public key associated with the first GVM.

13. The method as recited in claim 7, wherein the first per-GVM memory location set comprises a Platform Configuration Register (PCR) at which an entry indicative of a first configuration property of the first GVM is stored, further comprising:

encrypting, on behalf of the first GVM, a data value using a first cryptographic key stored in the first per-GVM memory location set, wherein the data value is to be decrypted as a precondition for performing a particular operation;

storing, in a particular location of the first per-GVM memory location set, an indication of contents of the PCR as of a time at which said encrypting was initiated; and verifying, at the MTTPM prior to performing the particular operation, that the first configuration property has not changed since the indication was stored in the particular location of the first per-GVM memory location set.

14. A system, comprising:
a plurality of virtualization hosts of a virtual computing service, including a virtualization host with an attached multi-tenant trusted platform module (MTTPM), wherein the MTTPM comprises (a) one or more shared hardware subcomponents to be used on behalf of a plurality of guest virtual machines (GVMs) instantiated at the virtualization host, including a first GVM and a second GVM and (b) a plurality of per-GVM hardware subcomponents, including a first per-GVM memory location set corresponding to the first GVM and a second per-GVM memory location set corresponding to the second GVM;

wherein the MTTPM is configured to:
in response to an indication of a first trusted computing request (TCR) of a first TCR category associated with the first GVM, access a first memory location of the first per-GVM memory location set to generate a first response indicative of a configuration of the first GVM;

in response to an indication of a second TCR of the first TCR category associated with the second GVM, access a second memory location of the second per-GVM memory location set to generate a second response which indicates that a configuration of the second GVM differs from the configuration of the first GVM; and in response to an indication of a third TCR of a different TCR category associated with a particular GVM of the plurality of GVMs, access a particular shared subcomponent of the one or more shared subcomponents to generate a third response to the third TCR, wherein the third response includes an output of a cryptographic processor of the MTTPM.

15. The system as recited in claim 14, wherein the first per-GVM memory location set includes one or more of: (a) a Platform Configuration Register (PCR) to be used for a GVM-specific configuration entry, (b) a PCR to be used to replicate a configuration entry pertaining to the plurality of GVMs, (c) an electrically erasable programmable read-only memory (EEPROM), (d) an attestation identity key (AIK) location, (e) a storage key location, or (f) an endorsement key location.

16. The system as recited in claim 14, wherein the particular shared subcomponent comprises one or more of: (a) a random noise generator, (b) a cryptographic key generator, (c) a hash generator, (d) a symmetric cryptographic engine, (e) an asymmetric cryptographic engine, (f) an endorsement key location, (g) a sequence number source, (h) a storage root key location, or (i) a PCR to be used for an entry indicative of shared configuration information of the plurality of GVMs.

17. The system as recited in claim 14, wherein the virtualization host comprises a virtualization management component configured to:
store a mapping between a first set of memory-mapped I/O (MMIO) addresses designated to be used as target addresses for TCRs of one or more TCR categories, and a second set of MMIO addresses, wherein the first TCR indicates a particular MMIO address of the first set as a target address;
determine, based at least in part on (a) an indication that the first TCR was generated at the first GVM and (b) the mapping, a second MMIO address of the second set of MMIO addresses to which the particular MMIO address is mapped, wherein the second MMIO address is indicative of the first memory location of the first per-GVM memory location set.

18. The system as recited in claim 17, wherein at least a portion of the mapping is stored in an extended page table of a memory management unit of the virtualization host.

19. The system as recited in claim 14, wherein the MTTPM is attached to a communication bus of the virtualization host, wherein the communication bus comprises one or more of: (a) a Low Pin Count (LPC) bus, (b) a Peripheral Component Interconnect-Express (PCIe) bus, (c) a Serial Peripheral Interface (SPI) bus, (d) an enhanced Serial Peripheral Interface (eSPI) bus, or (e) an Inter-Integrated Circuit (I2C) bus.

20. A multi-tenant trusted platform module (MTTPM) attachable to a communication bus of a virtualization host, wherein the MTTPM comprises one or more hardware memories that includes a plurality of per-guest-virtual-machine (per-GVM) memory location sets and one or more shared components usable by the plurality of GVMs, and wherein the MTTPM is configured to:
in response to an indication of a first trusted computing request (TCR) associated with a first GVM of a plurality of GVMs instantiated at the virtualization host, access a first memory location of a first-per-GVM memory location set to generate a first response indicative of a configuration of the first GVM;
in response to an indication of a second TCR associated with a second GVM of the plurality of GVMs, access a second memory location of a second-per-GVM memory location set to generate a second response, wherein the second response is indicative of a different configuration of the second GVM; and
in response to an indication of a third TCR originating at a particular GVM of the plurality of GVMs, access a particular shared component of the one or more shared components to generate a third response indicative of an output of a cryptographic processor of the MTTPM.

21. The MTTPM as recited in claim 20, wherein the first per-GVM memory location set includes one or more of: (a) a Platform Configuration Register (PCR) to be used for a GVM-specific configuration entry, (b) a PCR to be used to replicate a configuration entry pertaining to the plurality of GVMs, (c) an electrically erasable programmable read-only memory (EEPROM), (d) an attestation identity key (AIK) location, (e) a storage key location, or (f) an endorsement key location.

22. The MTTPM as recited in claim 20, further configured to:
receive an indication of a fourth TCR originating at another GVM of the plurality of GVMs; and
generate a response to the fourth TCR using at least a particular shared component of the one or more shared components and a particular per-GVM subcomponent of the plurality of per-GVM subcomponents.

23. A non-transitory computer-accessible storage medium storing program instructions that when executed on one or more processors implements a virtualization management component of a virtualization host equipped with a trusted platform module (TPM), wherein the TPM includes a plurality of per-guest-virtual-machine (per-GVM) memory location sets usable by individual guest virtual machines (GVMs) of the virtualization host and one or more shared components usable by all GVMs of the virtualization host, and wherein the virtualization management component is configured to:
determine that a first trusted computing request (TCR) indicating a particular input/output (I/O) address selected from a range of I/O addresses assigned for TPM operations is associated with a GVM of the virtualization host;
identify a first mapped I/O address of a first per-GVM memory location to which the particular I/O address is mapped with respect to TCRs associated with the first GVM and indicate the first mapped I/O address in a command directed to the TPM to generate a response to the first TCR indicative of a configuration of the first GVM;
determine that a second TCR indicating the particular I/O address is associated with a second GVM of the virtualization host;
identify a second mapped I/O address of a second per-GVM memory location to which the particular I/O address is mapped with respect to TCRs associated with the second GVM and indicate the second mapped I/O address in another command directed to the TPM to generate a response to the second TCR indicative of a different configuration of the second GVM;
determine that a third TCR indicating another I/O address is directed to a particular shared component of the one or more shared components; and
identify a third mapped I/O address of the particular shared component to which the particular I/O address is mapped and indicate the third mapped I/O address in an additional command directed to the TPM to generate a response to the third TCR indicative of an output of a cryptographic processor of the MTTPM.

* * * * *